United States Patent [19]

Bernadiner et al.

[11] 3,974,021

[45] Aug. 10, 1976

[54] PROCESS AND CYCLONE REACTOR FOR FIRE DECONTAMINATION OF INDUSTRIAL WASTE WATER CONTAINING ORGANIC AND REFRACTORY MINERAL IMPURITIES

[76] Inventors: Mikhail Naumovich Bernadiner, Ozernaya ulitsa 36, kv. 20; Anatoly Alexandrovich Dobrovolsky, Novo-Kuzminskaya ulitsa, 10, kv. 91; Boris Semenovich Esilevich, ulitsa 9 Rota, 14, kv. 10; Georgy Nesanelovich Rubinshtein, ulitsa Shukhova, 17, kv. 10; Viktor Georgievich Gubarev, ulitsa Novaya Bodraya, 5, korpus 2, kv. 341; Emanuil Ivanovich Shipov, M. Afanasievsky pereulok, 6, kv. 4, all of Moscow; Petr Mikhailovich Sharov, Schekinsky raion, poselok Pervomaisky, ulitsa Komsomolskaya, 33, kv. 14, Tulskaya oblast; Boris Isaevich Lurie, Schekinsky raion, poselok Pervomaisky, ulitsa Komsomolskaya, 33, kv. 22, Tulskaya oblast; Arkady Dmitrievich Vodnev, Schekinsky raion, poselok Pervomaisky, ulitsa Oktyabrskaya, 16a, kv. 10, Tulskaya oblast; Alexandr Bentsionovich Moshkovich, ulitsa Yasnaya, 6, kv. 49, Schekino Tulskoi oblasti; Pavel Alexandrovich Lupanov, ulitsa Sovetskaya, 32, kv. 154, Vidnoe Moskovskoi oblasti, all of U.S.S.R.

[22] Filed: Aug. 27, 1974

[21] Appl. No.: 500,854

[52] U.S. Cl. ............................... 159/4 A; 159/48 R; 159/6 R; 431/173; 431/175; 110/7 B
[51] Int. Cl.² ...................... B01D 1/16; B01D 1/22; F23C 5/18
[58] Field of Search ............. 159/4 A, 47 WL, 48 R, 159/6 R; 110/7 B, 7 S, 28 F, 72, 75; 431/173, 175, 176

[56] References Cited
UNITED STATES PATENTS

| | | | |
|---|---|---|---|
| 1,918,397 | 7/1933 | Jezler | 122/136 |
| 2,161,110 | 6/1939 | Tomlinson et al. | 159/4 A |
| 2,593,503 | 4/1952 | Tomlinson et al. | 159/4 A |
| 2,640,532 | 6/1953 | Bowen et al. | 159/4 A |
| 2,808,011 | 10/1957 | Miller et al. | 110/7 B |
| 2,883,948 | 4/1959 | Seidl | 431/176 |
| 2,893,829 | 7/1959 | Hutton | 159/4 A |
| 3,215,099 | 11/1965 | Coulter, Jr. | 159/4 A |
| 3,333,917 | 8/1967 | Bergholm | 159/4 A |
| 3,421,462 | 1/1969 | Wessberg | 110/7 R |

*Primary Examiner*—Jack Sofer
*Attorney, Agent, or Firm*—Robert E. Burns; Emmanuel J. Lobato; Bruce L. Adams

[57] ABSTRACT

A process for fire decontamination of industrial waste water containing organic and refractory mineral impurities, wherein into a reactor, in which there is maintained a temperature corresponding to the burning out temperature of organic impurities, there is fed a waste water containing organic impurities and fusible mineral impurities, in a sprayed state, so that during the burning out of organic impurities a film of melt of the fusible minerals impurities is formed on the reactor walls which flows therealong. Waste water containing organic and refractory mineral impurities is fed into this reactor in such a manner that during the burning out of organic impurities, the refractory mineral impurities penetrate in said film of melt of the fusible mineral impurities and discharged from the reactor along with this film. The cyclone reactor for conduction of this process is provided, in the top portion of its vertical cylindrical chamber, with burner apparatus arranged tangentially to the chamber to create a whirling flow of combustion products, and injection nozzles for feeding the waste water arranged below the burner apparatus in at least two transverse planes. The injection nozzles in the upper plane of the chamber are radially directed and adapted for feeding the waste water containing organic and fusible mineral impurities, and the injection nozzles in the lower plane of the chamber being adapted for feeding waste water containing organic and refractory mineral impurities and directed at an angle with respect to the chamber walls, this angle ensuring the introduction of the waste water into the whirling flow of combustion products.

7 Claims, 4 Drawing Figures

PROCESS AND CYCLONE REACTOR FOR FIRE DECONTAMINATION OF INDUSTRIAL WASTE WATER CONTAINING ORGANIC AND REFRACTORY MINERAL IMPURITIES

BACKGROUND OF THE INVENTION

The invention relates to a process and equipment for elimination of various production wastes for environment protection, and in particular to a process and cyclone reactor for fire decontamination of industrial waste water containing organic and refractory mineral impurities.

Mineral impurities are divided herein into fusible and refractory impurities depending on the temperature of elimination of organic impurities. If the mineral impurities are melted below this temperature, they are attributed to fusible impurities, and if their melting point lies above this temperature, they are referred to as refractory ones.

The process and reactor according to the invention may be successfully employed for fire decontamination of local industrial waste water of chemical production processes in various industries.

For a large group of industrial waste water, the application of widely used methods of purification (chemical and biochemical methods) is frequently useless. This is especially true for purification of production waste water containing a large variety of organic and mineral impurities with high concentration thereof. Many impurities of industrial waste water are toxic for microorganisms so that they cannot be decontaminated by the biochemical method. The fire decontamination with the employment of furnaces of various designs is now widely used for practical solution of the problems involving such waste water.

Known in the art is a process for fire decontamination of industrial waste water containing organic and refractory mineral impurities comprising feeding waste water in a sprayed state into a high-temperature fuel spray of a furnace in which liquid or gaseous fuel is burnt. The gas temperature in the furnace is maintained at a level sufficient for melting the particles of refractory mineral impurities formed after the evaporation of drops of the waste water and burning out of organic impurities.

Refractory mineral impurities are discharged from the furnace mainly in the form of a melt, and partially — with fume gases, in the form of fine dust particles.

The main disadvantage of the above-described method consists in an elevated fuel consumption for conducting the decontamination process due to the need in melting refractory mineral impurities. Thus, the temperature level in the furnace is considerably above the gas temperature required for complete burning out of organic impurities. It is also known to decontaminate waste water containing organic and refractory mineral impurities comprising feeding waste water in a sprayed state into a furnace, wherein the temperature is maintained at a level sufficient for burning out organic impurities but considerably lower than the melting temperature of refractory mineral impurities. In this case, solid particles of refractory mineral impurities formed after the evaporation of drops of the waste water are entrained from the furnace with fume gases so that they should be caught in wet or dry scrubbers installed after the furnace.

This method is advantageous in that it has a low specific fuel consumption for conducting the decontamination process determined by a minimum temperature of fume gases necessary to completely burn out organic impurities.

However, this conventional method is deficient in that it requires cumbersome and complicated equipment for purification of gases from finely divided dust particles, because refractory mineral impurities are substantially completely entrained with fume gases from the furnace.

Known methods can be carried out in various furnaces, such as shaft furnaces and cyclone reactors.

Known in the art is a shaft furnace for fire decontamination of waste water containing organic and refractory mineral impurities comprising a vertical shaft having burner apparatus located in the bottom portion thereof for combined feeding of fuel and air for burning the organic fraction of the fuel and organic impurities of waste water. Located above the burner apparatus in the transverse plane of the shaft there are injection nozzles for feeding waste water. In the bottom portion of the shaft there is provided a tap for discharging a melt of mineral impurities, and an opening for discharging fume gases is located in the bottom portion. Equipment for purification of fume gases from particles of mineral impurities is installed after the opening for discharging fume gases.

The operation of such furnace by any of the above-described methods is characterized by a low specific capacity in terms of the weight of waste water being decontaminated per one cubic meter of the furnace volume per hour, low ratio of catching of mineral impurities, high heat losses in the combustion chamber. This results in greater capital investments and high operating cost.

The most efficient and flexible apparatus for conducting such processes is a cyclone reactor.

A conventional cyclone reactor for fire decontamination of waste water comprises a vertical cylindrical chamber having dimensions depending on the capacity of the reactor and physical and chemical composition of the waste water being decontaminated. The top portion of the chamber is made of refractory and isolating brick to ensure a reliable stability of the fuel combustion and is provided with a tapered, flat or dome-shaped cover. Burner apparatus are located in the top portion of the chamber and are arranged tangentially to the walls thereof and equally spaced apart along the generatrix for combined feeding of fuel and air into the chamber for burning the organic fraction of the fuel and organic impurities of the waste water. The portion of the chamber disposed below the top portion thereof is cooled with water and is provided with a chilled lining. Injection nozzles for feeding and spraying waste water in the chamber are arranged on the periphery of the chamber below the burner apparatus and tangentially to the walls of the chamber. In the bottom portion of the chamber there is provided a base with an opening communicating this chamber with a gas duct for discharging combustion products and a melt of mineral impurities.

A tap for discharging the melt of mineral impurities is located in the bottom portion of the gas duct.

In the course of the above-described processes of fire decontamination of waste water in such cyclone reactor, high specific loads of decontaminated liquor per volume of the reactor are achieved.

However, this known cyclone reactor is deficient in that, with the radial arrangement of the injection nozzles on the periphery of the chamber thereof, refractory mineral impurities should be melted, because otherwise they will be entrained with fume gases. At the same time, in order to melt refractory mineral impurities, the temperature of the fume gases should be maintained at a level above the melting temperature of these mineral impurities. Thus, the temperature level in the reactor will considerably exceed the temperature of the fume gases required for complete burning out of organic impurities and melting fusible mineral impurities, whereby the fuel consumption is increased.

The conduct of the process of fire decontamination of waste water at a temperature of fume gases discharged from the reactor sufficient for complete burning out of organic impurities results in a considerable amount of dust of refractory mineral impurities leaving the cyclone reactor with the fume gases. It should be noted, that complicated and expensive equipment is required for catching refractory mineral impurities by purifying the fume gases containing finely divided impurities.

SUMMARY OF THE INVENTION

It is an object of the invention to provide a process for fire decontamination of industrial waste water containing organic and refractory mineral impurities and a cyclone reactor for conducting this process which permit to obtain high efficiency and elevated ratio of catching refractory mineral impurities without using complicated and expensive auxiliary equipment for purification of fume gases from finely divided dust particles.

This object is accomplished due to the fact that in a process for fire decontamination of industrial waste water containing organic and refractory mineral impurities comprising feeding them into a reactor, burning out organic impurities and discharging from the reactor refractory mineral impurities and combustion products, according to the invention, waste water containing organic impurities and fusible mineral impurities is fed into the reactor in such a manner that during the burning out of organic impurities a film of melt of the fusible mineral impurities is formed on the reactor walls which flows down therealong, and waste water containing organic and refractory mineral impurities is sprayed in the reactor in such a manner that, after the burning out of organic impurities, refractory mineral impurities penetrate in the film of melt of the fusible mineral impurities and are discharged from the reactor together with this film.

A cyclone reactor for conducting the above-described process comprises a vertical cylindrical chamber having burner apparatus in its top portion for feeding fuel and air into the chamber arranged tangentially to the walls thereof for creating a whirling flow of combustion products, injection nozzles located below the burner apparatus for feeding waste liquors, an opening in a base communicating the chamber with a gas duct for discharging combustion products, and a tap located in the bottom portion of the gas duct for discharging a melt of mineral impurities, according to the invention, the injection nozzles for feeding waste water are arranged in at least two vertically superposed transverse planes of the chamber, the injection nozzles arranged in the upper planes of the chamber being radially directed and adapted for feeding waste water containing organic impurities and fusible mineral impurities, and the injection nozzles arranged in the lower planes of the chamber being adapted for feeding waste water containing organic impurities and refractory mineral impurities, directed at an angle with respect to a tangent to the inner periphery of the chamber, the angle ensuring the introduction of the waste water into the whirling flow of combustion products.

The process and cyclone reactor according to the invention enable the conduct of the process of fire decontamination of waste water containing organic and refractory mineral impurities with a minimum possible specific fuel consumption and at elevated ratio of catching of refractory mineral impurities within the cyclone reactor with their discharge along with the melt of fusible mineral impurities.

The studies have shown that such refractory mineral products as sodium o-phosphate ($Na_3PO_4$), aluminium oxide ($Al_2O_3$), silicon dioxide ($SiO_2$) and the like can be caught within the chamber of the cyclone reactor concurrently with decontamination of industrial waste water containing various types of organic impurities, such as alcohols, acids, ketones, aldehydes, phenols, amines and the like.

The tests conducted with an experimental plant for decontamination of alkaline waste liquor from the caprolactam production containing sodium salts of organic acids, and waste water from a biochemical plant containing organic impurities and refractory aluminium oxide revealed the presence of $Na_2CO_3$ and $Al_2O_3$ in the melt discharged from the reactor.

BRIEF DESCRIPTION OF THE DRAWINGS

The invention will now be described in detail with reference to a specific preferable embodiment of a process and cyclone reactor for fire decontamination of waste water illustrated in the accompanying drawings, in which.

DESCRIPTION OF THE PREFERRED EMBODIMENT

Figure 1:
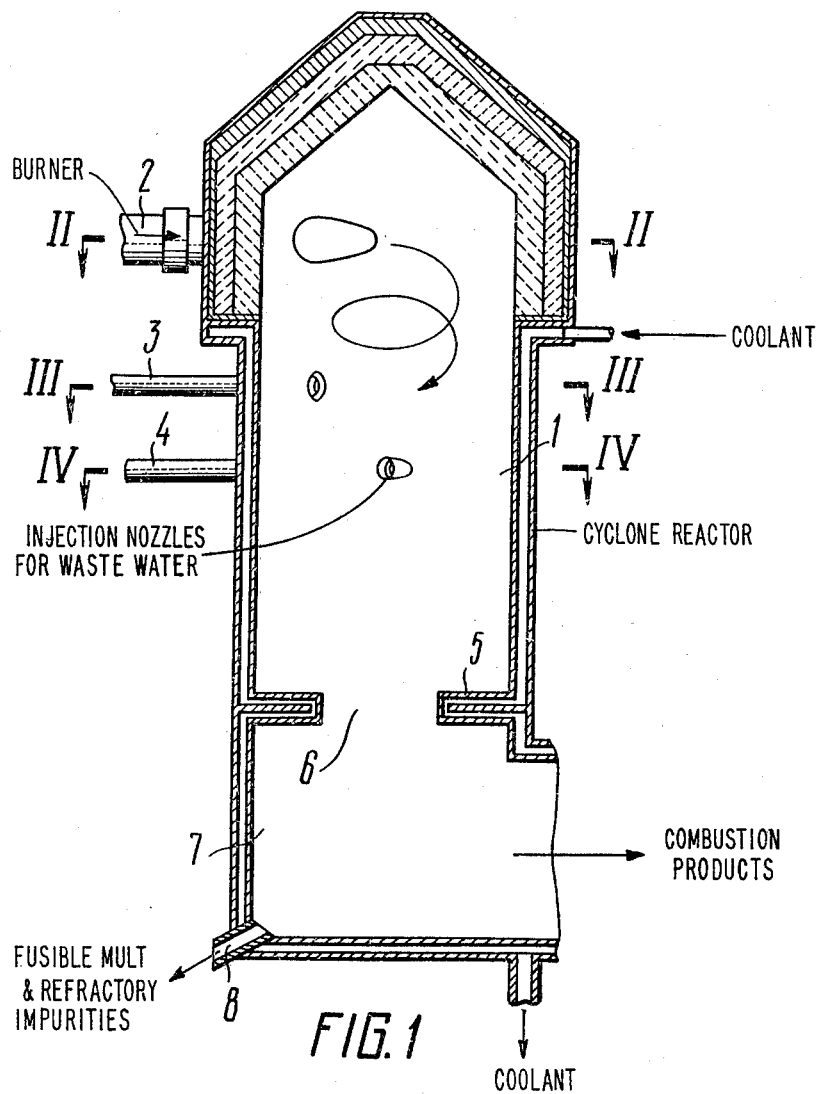
FIG. 1 is a longitudinal section view of a cyclone reactor for fire decontamination of waste water according to the invention.

The process for fire decontamination of industrial waste water containing organic and refractory mineral impurities according to the invention is conducted in the following manner.

Fuel and air required for combustion of both fuel and combustible impurities of waste water are fed into the reactor in the tangential direction. Sprayed waste water containing organic and fusible mineral impurities, such as waste liquor from weed killers production containing in g/l: sodium chloride—230, methyl alcohol — 10, formaldehyde —1, aniline —13, polyamines — 7 is introduced into a flow of combustion products at a temperature 1400°–1550°C.

High-temperature combustion products cause the evaporation of water drops, oxidize the combustible impurities and melt the particles of fusible mineral impurities (a melting temperature of fusible mineral impurities is of about 810°C), this waste water being fed into the reactor in such a manner that during the burning out of organic impurities a film of a melt of the fusible mineral impurities is formed on the reactor walls which flows down therealong. The formation of the film of melt of the fusible mineral impurities may be effected by different methods known per se, e.g. by introducing waste water tangentially to the reactor walls, whereby the fusible mineral impurities are projected to the reactor walls to form a film of melt, or by introducing waste water into just whirled flow of combustion products of fuel and air. This film can be also formed by uniformly spraying the reactor walls with waste water using swingable injection nozzles.

The film of melt of the fusible mineral impurities moves down under gravity and by force of the kinetic energy of the flow of combustion products. Waste water from the etching process containing in g/l: emulsifier— 10, oil —3 and $Na_3PO_4$ — 30 (melting point of $Na_3PO_4$ — 1340°C) is introduced in a sprayed state into the reactor in such a manner that during the burning out of organic impurities the refractory mineral impurities penetrate in the film of melt of the fusible mineral impurities. For that purpose, the waste water containing refractory mineral impurities may be fed tangentially to the inner periphery of the chamber so that it is introduced into the whirled flow of combustion products, and the refractory mineral impurities are projected to the reactor walls to be entrained by the flow of molten mineral impurities, or alternatively, the waste water containing refractory mineral impurities may be injected into the reactor under a pressure ensuring the penetration of the refractory mineral impurities in the film of melt of the fusible mineral impurities.

At a temperature of fume gases of 1100°–1200°C the drops of waste water are evaporated, and the combustible impurities are oxidized with an excess of oxygen into harmless gaseous products ($CO_2$ and $H_2O$) to be discharged from the reactor along with fume gases.

Dried solid particles of refractory mineral impurities are discharged from the reactor along with the film of melt of the fusible mineral impurities.

With a total coefficient of air consumption of the furnace of about 1.1 and a temperature of fume gases of the order of 1000°C, there are no chemically unreacted products in the fume gases in the example considered herein. The dry fume gases have in this case the following composition: $CO_2$ — 10.7%; $O_2$ —2.0%; CO — 0.0%; $N_2$ — 87.3%, and the melt discharged from the reactor consisted of NaCl with impurities in the form of $Na_3PO_4$.

The process according to the invention is the most efficient when conducted in a cyclone reactor.

Figure 2:
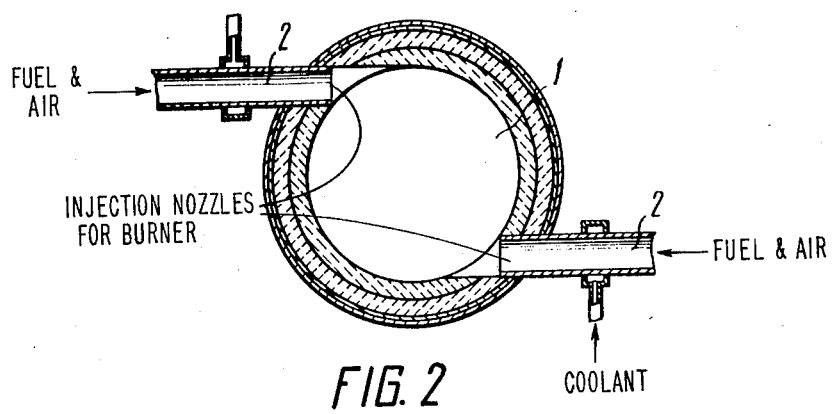
FIG. 2 is a sectional view taken along a section line II—II in FIG. 1.
Figure 3:
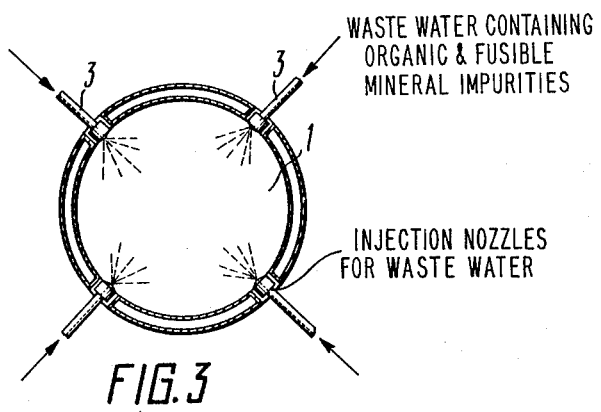
FIG. 3 is a sectional view taken along a section line III—III in FIG. 1.

The cyclone reactor for fire decontamination of waste water according to the invention comprises a vertical cyclindrical chamber 1 (FIG. 1). The top portion of chamber 1 accommodates burner apparatus 2 (FIGS. 1,2) of a known design for feeding therethrough fuel and air into the chamber. The burner apparatus 2 are directed tangentially to the chamber to create a whirling flow of combustion products. Injection nozzles 3 are disposed below the burner apparatus 2 and are radially directed in the transverse plane of the chamber 1 (FIGS. 1,3) for feeding waste water containing organic and fusible mineral impurities.

Figure 4:
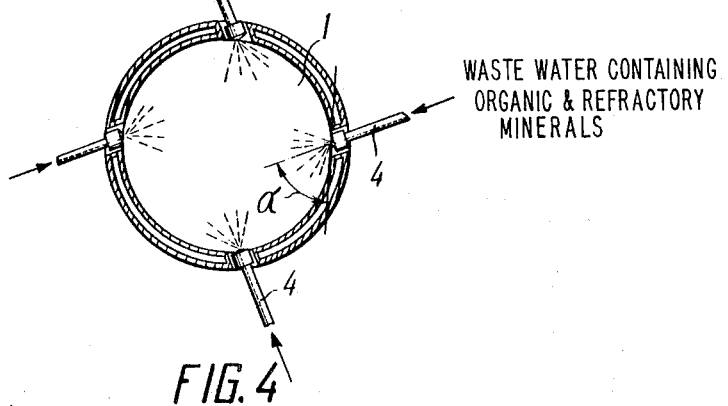
FIG. 4 is a sectional view taken along a section line IV—IV in FIG. 1.

Injection nozzles 4 (FIGS. 1,4) are located below the injection nozzles 3 in a transverse plane of the reactor chamber 1 and directed at an angle $\alpha$ (FIG. 4) with respect to a tangent to the inner periphery thereof for feeding waste water containing refractory mineral impurities in combination with organic impurities. The angle $\alpha$ is selected such as to ensure the penetration of the waste water in the whirling flow of combustion products.

The bottom portion of the chamber 1 has a base 5 (FIG. 1) provided with an opening 6 communicating the chamber 1 with a gas duct 7 for discharging combustion products.

The bottom protion of the gas duct 7 is provided with a tap 8 for discharging the melt of fusible mineral impurities along with the refractory impurities.

The number of the burner apparatus 2, injection nozzles 3 and injection nozzles 4 is selected depending on a preset capacity of the reactor as a whole and with a particular consideration of the composition of impurities in waste water.

The walls of the top portion of the chamber 1 of the cyclone reactor are provided with a lining. Below the level of the burner apparatus 2, the cyclone reactor is provided with a chilled lining having a circulatory or evaporative water cooling system.

To improve the reliability of the burner apparatus 2, their nozzles are also cooled e.g. with water.

The injection nozzles 3 and 4 are arranged in two transverse planes of the chamber 1; it should be noted, however, that these injection nozzles for feeding waste water may be arranged in a plurality of vertically superposed transverse planes of the chamber 1 in a stagewise manner, and in this case the injection nozzles arranged in the upper stages are adapted to feed waste water containing organic and fusible mineral impurities and directed similarly to the injection nozzles 3, and the injection nozzles of the lower stages are adapted for feeding waste water containing organic and refractory mineral impurities and directed similarly to the injection nozzles 4.

The vertical spacing of the injection nozzle stages depends on the composition of waste water and specific weight capacity of the cyclone reactor, this spacing effecting the completeness of decontamination of waste water.

Thus, if the injection nozzles 4 are spaced apart from the injection nozzles 3 at a distance lesser than desired value, the process of the burning out of organic impurities is still conducted sufficiently completely, and the ratio of catching of the fusible mineral impurities within the reactor is maintained at a sufficiently high level, but the entrainment of the refractory impurities with fume gases increases, which is due to the incidence of a considerable amount of particles of the refractory mineral impurities to a bare wall free of any film of melt of the fusible mineral impurities.

With the injection nozzles 4 being mounted at a distance from the injection nozzles 3 greater than desirable, the ratio of catching of particles of the fusible mineral impurities and refractory mineral impurities within the cyclone reactor is still high, but chemically unreacted products (CO and $H_2$) are revealed in the fume gases, which is due to a short time of exposure of combustible products in the chamber 1.

The angle $\alpha$ of inclination of the injection nozzles 4 for feeding waste water containing organic and refractory mineral impurities with respect to a tangent to the inner periphery of the chamber 1 is also of a great importance for the process performance.

With the value of this angle below the lower limit value the entrainment of the refractory impurities remarkably increases due to a reduction of the separation effect, while with the angle $\alpha$ greater than the upper limit value there appears chemical undercombustion in the fume gases which is due to the projection of drops of waste water containing organic and refractory mineral impurities, which had not enough time to evaporate, to the walls of the chamber 1.

During the combined fire decontamination in the cyclone reactors of waste alkaline water from the production of caprolactam mainly containing sodium salts of lower dicarboxylic acids that yield, upon the decontamination, soda ash ($Na_2CO_3$) flowing down along the periphery of the reactor in the form of a melt film (fusible mineral impurity), and waste water from the settling tanks of a biochemical purification plant containing organic and refractory impurities ($Al_2O_3$, $SiO_2$), it has been found that an optimal spacing of the injection nozzle stages for feeding said waste waters was 0.3–0.5 of the outside diameter of the chamber of the cyclone reactor, and an optimal angle $\alpha$ of inclination of the injection nozzles 4 was 65°–75°.

The cyclone reactor functions as follows:

Fuel and air required for combustion of the fuel and organic impurities are supplied to the burner apparatus 2. The fuel combustion is completed approaching the section of the chamber 1 where the injection nozzles 3 are accommodated which feed waste water containing organic and fusible mineral impurities. Sprayed waste water containing organic and fusible mineral impurities is fed through the injection nozzles 3 into a flow of high-temperature combustion products. During the mixing of the sprayed flow of said waste water with high-temperature combustion products, drops of the waste water evaporate, combustible impurities are oxidized with oxygen of fume gases, and the particles of fusible mineral impurities are melted. Thus, the molten fusible mineral impurities are separated on the wall of the chamber 1 and flow down therealong in the form of a film in the direction opposite to the flow direction of combustion products.

Sprayed waste water containing refractory mineral impurities in combination with organic impurities is introduced into a flow of high-temperature combustion products through the injection nozzles 4. Thus, the drops of said waste water evaporate, and the refractory mineral products are separated to the film of melt of the fusible mineral impurities to flow down therewith.

When passing through the opening 6, the fume gases are intensively intermixed, which contributes to a more complete combustion of combustible impurities, and then they are fed for further treatment or discharged into atmosphere through the gas duct 7.

Molten particles of the fusible mineral impurities containing the refractory mineral impurities are discharged through the opening 6 into the gas duct 7 and from the chamber 1 of the cyclone reactor through the tap 8.

What is claimed is:

1. A process for fire decontamination of industrial waste water containing organic and fusible mineral impurities and other waste water containing refractory mineral impurities comprising, introducing into a combustion chamber of a reactor a fuel air mixture combusted as a whirling mixture of combustion gases, introducing into the combustion gases below the level of the combustion chamber at least one spray of waste water containing organic and fusible impurities to combust the organic impurities and evaporate the water therefrom and develop a zone in said reactor in which a film flow of the fused fusible impurities flows under the effect of gravity downwardly on the interior wall surfaces of the reactor, introducing tangentially to said interior surfaces and into said zone at least one spray of waste water having refractory mineral impurities for evaporating the water and entraining the refractory impurities in said film flow, removing the combustion products of the organic material and removing the film flow of fused fusible mineral impurities along with the refractory impurities entrained therein.

2. A process according to claim 1, in which the second-mentioned spray of waste water is introduced below the level of the first-mentioned spray of waste water.

3. A reactor for fire decontamination of industrial waste water containing organic and fusible mineral impurities and other waste water containing refractory mineral impurities comprising, means defining a chamber having at an upper combustion zone, means to introduce air and fuel for combusting the air and fuel as a whirling mixture of combustion gases, means for introducing into the combustion gases below the level of the combustion zone at least one spray of waste water containing organic and fusible impurities to combust the organic impurities and evaporate the water therefrom and develop a second lower zone in said reactor in which a film flow of the fused fusible impurities flows under the effect of gravity downwardly on the interior wall surfaces of the reactor, means for introducing tangentially to said interior surfaces and into said second zone at least one spray of another waste water having refractory mineral impurities for evaporating the water therefrom and entraining the refractory impurities in said film flow, means for removing the combustion products of the organic material, and means for removing from said chamber the film flow along with all the impurities entrained therein.

4. A reactor according to claim 3, in which said chamber comprises a vertical, cylindrical chamber, and the means for introducing the second-mentioned spray of other water is below the level of the first-mentioned spray of waste water.

5. A reactor according to claim 4, in which the means for spraying the second-mentioned spray comprises additional spray means in the same horizontal plane transverse to said cylindrical chamber and, as the second-mentioned spray means.

6. A reactor according to claim 4, in which said means to introducing the first-mentioned spray comprises additional spray means for introducing additional sprays of similar waste water circumferentially spaced from the first-mentioned spray means.

7. A reactor according to claim 6, in which said additional spray means are in the same horizontal plane transverse to said cylindrical chamber as the first-mentioned spray means.

* * * * *